US012731144B2

(12) United States Patent
Smets et al.

(10) Patent No.: US 12,731,144 B2
(45) Date of Patent: Sep. 8, 2026

(54) SYSTEMS AND METHODS FOR USE IN BIOMETRIC-ENABLED NETWORK INTERACTIONS

(71) Applicant: MASTERCARD INTERNATIONAL INCORPORATED, Purchase, NY (US)

(72) Inventors: Patrik Smets, Begijnendijk (BE); Florent Hay, Laeken (BE); Eddy Van De Velde, Leuven (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 179 days.

(21) Appl. No.: 18/208,864

(22) Filed: Jun. 12, 2023

(65) Prior Publication Data

US 2024/0005328 A1 Jan. 4, 2024

Related U.S. Application Data

(63) Continuation of application No. PCT/US2023/024782, filed on Jun. 8, 2023.

(Continued)

(51) Int. Cl.

*G06Q 20/40* (2012.01)
*G06Q 30/04* (2012.01)

(52) U.S. Cl.

CPC ... *G06Q 20/40145* (2013.01); *G06Q 20/4016* (2013.01); *G06Q 30/04* (2013.01)

(58) Field of Classification Search

CPC ......... G06Q 20/40145; G06Q 20/4016; G06Q 30/04; H04L 2209/56; H04L 9/3231; H04L 63/086; G06F 21/32

See application file for complete search history.

(56) References Cited

U.S. PATENT DOCUMENTS 5,838,812 A * 11/1998 Pare, Jr .................. G06Q 20/10 382/181
8,364,583 B1 * 1/2013 Mussman ............ G06Q 20/305 705/40

(Continued)

FOREIGN PATENT DOCUMENTS

KR 10-1995711 7/2019

*Primary Examiner* — Steven S Kim
(74) *Attorney, Agent, or Firm* — Harness, Dickey & Pierce, P.L.C.

(57) ABSTRACT

Systems and methods are provided for managing disputes in biometric-enabled network interactions. One example computer-implemented method includes receiving, at a biometric identity switch (BIS), a dispute notification for a biometric-enabled network interaction involving an account of a user, and retrieving biometric data specific to the biometric-enabled network interaction. The method also includes determining, by the BIS) whether the biometric data is representative of the user and, in response to the biometric data not being representative of the user, requesting, from a biometric service provider, a biometric identifier for an additional user, based on the biometric data. The method then includes receiving, by the BIS, the biometric identifier from the biometric service provider, identifying an interaction history of the additional user, based on the biometric identifier, and determining whether to assign the biometric-enabled network interaction to the additional user, based on the interaction history of the additional user.

8 Claims, 3 Drawing Sheets

Related U.S. Application Data

(60) Provisional application No. 63/356,929, filed on Jun. 29, 2022.

(56) References Cited

U.S. PATENT DOCUMENTS

| | | | | |
|---|---|---|---|---|
| 8,818,904 | B2 * | 8/2014 | Keane | G06Q 20/40145 705/64 |
| 10,277,400 | B1 | 4/2019 | Griffin et al. | |
| 11,521,214 | B1 * | 12/2022 | Hetrick | G06Q 10/107 |
| 11,669,894 | B2 * | 6/2023 | Nordyke | G06Q 40/02 707/769 |
| 2013/0232075 | A1 * | 9/2013 | Monaghan | G06Q 20/40 705/44 |
| 2019/0034934 | A1 * | 1/2019 | Trelin | G06F 21/32 |
| 2019/0087825 | A1 | 3/2019 | Bhatt et al. | |
| 2019/0295094 | A1 * | 9/2019 | Arora | G06Q 20/3223 |
| 2020/0058032 | A1 * | 2/2020 | Lad | G06V 40/1365 |
| 2020/0143363 | A1 * | 5/2020 | Schmidt | G06Q 20/40145 |
| 2022/0027442 | A1 | 1/2022 | Militello et al. | |
| 2022/0108322 | A1 | 4/2022 | Cao et al. | |
| 2022/0366424 | A1 * | 11/2022 | Dorogusker | G06Q 20/3226 |
| 2023/0095285 | A1 * | 3/2023 | Abouelenin | G06Q 20/407 235/487 |
| 2023/0129991 | A1 * | 4/2023 | Hay | G06Q 20/40145 705/44 |

* cited by examiner

SYSTEMS AND METHODS FOR USE IN BIOMETRIC-ENABLED NETWORK INTERACTIONS

CROSS-REFERENCE TO RELATED APPLICATIONS

This application claims the benefit of, and priority to, U.S. Provisional Application No. 63/356,929, filed Jun. 29, 2022, and is also a continuation of PCT Application No. PCT/US2023/024782, filed Jun. 8, 2023, which claims the benefit of, and priority to, U.S. Provisional Application No. 63/356,929, filed Jun. 29, 2022. The entire disclosure of each of the above applications is incorporated herein by reference.

FIELD

The present disclosure is generally directed to systems and methods for use in biometric-enabled network interactions and, more particularly, to systems and methods for managing disputes involving such biometric-enabled network interactions.

BACKGROUND

This section provides background information related to the present disclosure which is not necessarily prior art.

Users are known to initiate interactions with parties in various manners. For example, a user (e.g., a consumer, etc.) may present a physical card, or other device, to a merchant party to thereby provide a numeric credential (e.g., a number, a token, etc.) to the merchant party and initiate an interaction with the merchant party, whereby the interaction is funded by an account associated with the numeric credential (and physical card or other device).

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
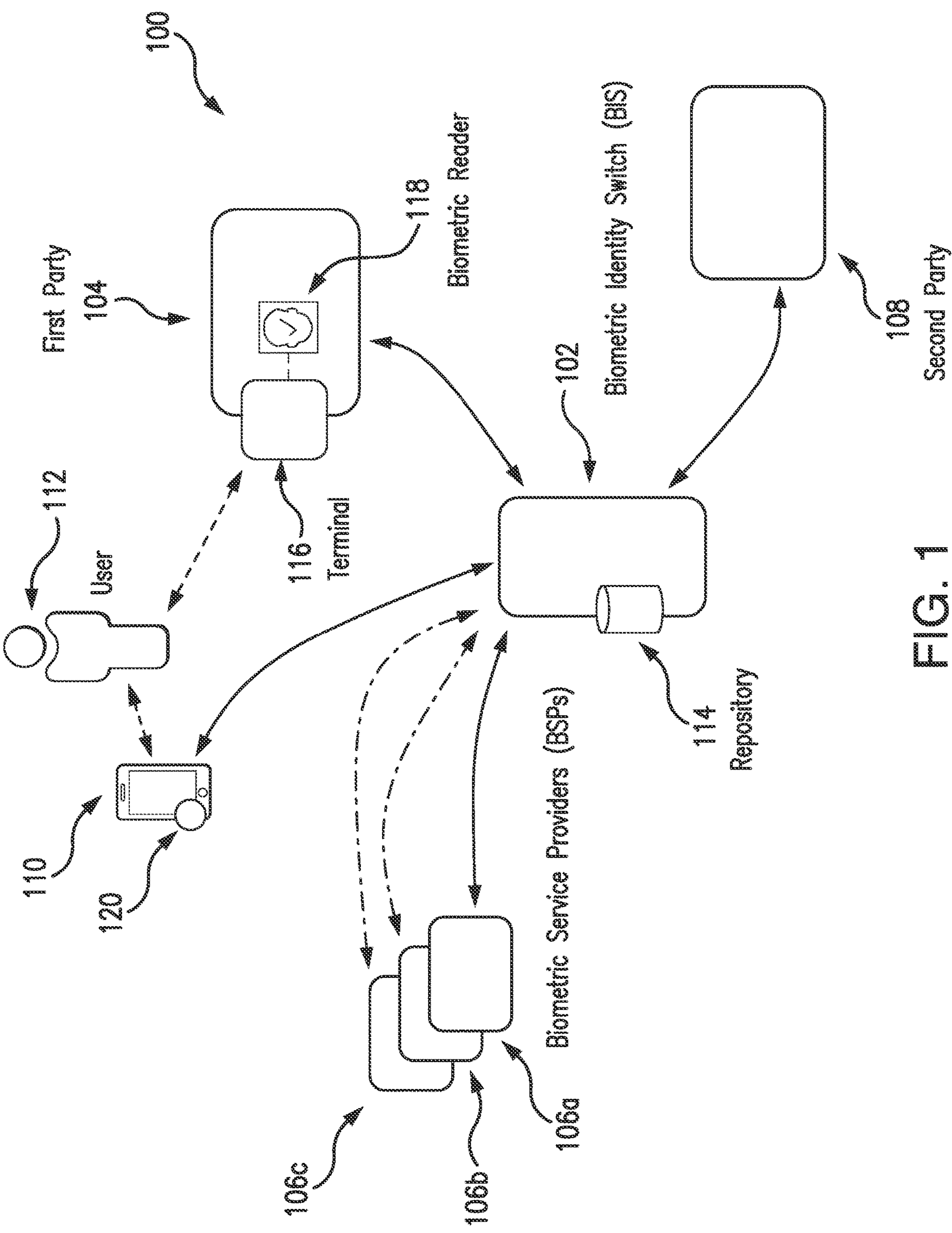
FIG. 1 is an example system of the present disclosure suitable for use in managing disputes (e.g., a chargeback dispute, etc.) involving biometric-enabled network interactions.

Example embodiments will now be described more fully with reference to the accompanying drawings. The description and specific examples included herein are intended for purposes of illustration only and are not intended to limit the scope of the present disclosure.

When users interact with merchants to purchase products (e.g., goods, services, etc.), the users may pay for the products with payment accounts (e.g., by presenting payment instruments associated with the payment accounts to the merchants, etc.). Occasionally, the interactions, or more specifically, transactions, may be initiated based on biometrics of the users. For example, a user may present his/her fingerprint or facial image to the merchant, which is captured by the merchant and then converted, by one or more parties, to a payment account credential used in the transaction. From time to time, although rarely, the biometric may be matched incorrectly to an incorrect (or improper) user, giving rise to a biometric mismatch (e.g., at a biometric provider, etc.). In this instance, because the biometric is the basis for the payment account credential being identified, an incorrect payment account credential is identified and used in the transaction. When the user associated with the account used (incorrectly) in the transaction discovers the improper use, it may be difficult to challenge the legitimacy of the transaction in certain instances based on the technical aspects of the biometric and/or manner of initiation of the transaction.

Uniquely, the systems and methods herein provide for resolution of biometric mismatches, or disputes related to the same, whereby the incorrect (or improper) user involved in the underlying biometric interaction is cleared in the interaction and the biometric mismatch interaction is appropriately assigned to the identified user (e.g., rather than a user associated with the account used in the transaction, etc.). In particular, when a user identifies a biometric mismatch interaction involving their account, a dispute notification is received by a biometric identity switch (BIS) (e.g., directly from the user, via an issuer of the user's account, etc.). The BIS confirms that the user is not represented by the biometric submitted in connection with the biometric mismatch interaction (e.g., based on enrollment data of the user, etc.). In response, the BIS then transmits the biometric from the underlying interaction to one or more biometric providers to identify potential correct matches for the biometric. Thereafter, the BIS receives the potential correct matches (e.g., an identifier thereof, etc.) and determines whether to assign the interaction to one of the potential matches (e.g., based on an interaction history of the potential match, a context of the underlying biometric interaction, etc.). The BIS is then permitted to assign, based on the biometric matching, the interaction to an account of the match (e.g., the user identified as presenting their biometric in connection with the underlying biometric interaction, etc.), whereby any charges associated with the underlying biometric interaction are directed to and/or paid by the identified user.

In this manner, because the BIS is able to identify the party involved in the underlying interaction that resulted in the biometric mismatch, the interaction is appropriately allocated and/or re-assigned to the user/party actually responsible for the interaction. As such, the BIS provides an enhancement to the flow of messaging related to disputes in biometric interactions, based on biometric matches/mismatches in the interactions, which provides a technical improvement to the overall functioning of the biometric system.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, relationships between users, biometric service providers, and parties; data privacy requirements and/or regulations; etc.

The illustrated system 100 generally includes a biometric identity switch (BIS) 102, a first party 104 (e.g., a merchant, another party, etc.), multiple biometric service providers (BSPs) 106*a-c* (broadly, biometric providers), a second party 108 (e.g., an issuer, another party, etc.) and a mobile device 110 (associated with a user 112), each of which is coupled in communication via one or more networks (e.g., as indicted by the arrowed lines in FIG. 1, etc.). The one or more networks may each include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

In this example embodiment, the BIS 102 is configured to perform operations related to biometric interactions associated with and/or involving the first party 104, for example. The BIS 102 is illustrated as a standalone party (e.g., an independent service, etc.) in the system 100 (e.g., an independent service, etc.). However, in other example embodiments, the BIS 102 may be incorporated into another party, such as, for example, a processing network, a financial institution, a biometric provider (e.g., the BSP 106*c*, etc.) or other related or suitable party, etc. For example, in one particular embodiment, the BIS 102 may be incorporated, in whole or in part, in a payment processing network operated by Mastercard International Incorporated, etc.

As shown, the BIS 102 includes a repository 114, which in this example embodiment is configured to store biometric identity records and/or other data, as described in more detail below. For example, the BIS 102 may be configured to store in the repository 114 (although it is not required in all embodiments) user biometrics and/or other user information for the user 112 and other users (e.g., for a limited period of time for dispute purposes, for longer periods of time such as a duration of enrollment of the users, etc.), etc. While the repository 114 is illustrated as part of (or as associated with) the BIS 102 in the system 100, it should be appreciated that in other embodiments the repository 114 may be separate from the BIS 102, whether physically or logically.

In the example embodiment of FIG. 1, the first party 104 includes a merchant (also referred to hereinafter as merchant 104) configured to offer products (e.g., goods, services, etc.) for sale to users (e.g., including user 112, etc.) and to sell products to users. That said, the first party 104 may be otherwise in other embodiments (e.g., other than a merchant, etc.), including, for example, a financial institution, another type or business or agency, etc., at which a user may desire to identify a specific payment account linked to a biometric for one or more purposes, etc. As shown, the merchant 104 includes a point of sale (POS) terminal 116 (broadly, terminal 116), which, among other things, is configured to receive payment account data (e.g., from payment devices, etc.), and then compile authorization messages for payment account transactions funding the purchase of products (e.g., goods, services, etc.) from the merchant 104 (e.g., via suitable authorization schemes, etc.). The POS terminal 116 is then configured to transmit the authorization messages, via processing networks, to issuers of payment accounts used in the transactions (e.g., second party 108 when the second party 108 is an issuer of an account used in a payment account transaction with the merchant 104, etc.). In particular, for example, for a transaction by the user 112 at the merchant 104, the terminal 116 for the merchant 104 is configured to compile an authorization request (e.g., an ISO 8583 message, etc.), and to then transmit the authorization request to an issuer of an account used in the transaction (e.g., second party 108, etc.), via an acquirer associated with the merchant 104 and a processing network (not shown). The issuer (e.g., second party 108, etc.) is configured, in turn, to respond with an authorization reply indicating whether the transaction is approved or declined. When approved, the purchase is completed with the user 112, and the processing network is configured to clear and settle the transaction between the acquirer and the issuer.

In connection with the above, the terminal 116 of the merchant 104 is also configured herein, by executable instructions (e.g., a software development kit (SDK), etc.), to communicate with the BIS 102 (e.g., to receive data from the BIS 102, to transmit data to the BIS 102, etc.), for example, in order to compile and transmit (or in connection with compiling and transmitting) an authorization request for a transaction (e.g., a data packet or authorization packet, etc.).

Moreover, as shown, the terminal 116 includes, or is connected to (as indicated by the dashed line in FIG. 1), a biometric reader 118. The biometric reader 118 may include, for example, a camera (e.g., a camera device capable of taking a biometric scan of a face, a hand, a finger, etc.), a fingerprint scanner, a palm scanner, a retina scanner, a voice recorder, etc. The biometric reader 118 is configured to capture a biometric of a user (e.g., the user 112, etc.), when prompted by the terminal 116, to then process the captured biometric, through formatting, encryption, etc., and to then return the biometric to the terminal 116 or transmit the biometric directly to the BIS 102. It should be appreciated that while only one biometric reader 118 is illustrated in FIG. 1, a different number of biometric readers may be employed in other embodiments. In particular, for different merchants and/or different terminals, the biometric readers may be different, whereby each biometric reader may be configured to process captured biometrics differently. Or, the terminal 116 may be associated with multiple different biometric readers, each configured to capture a different type of biometric. Also, while the biometric reader 118 is illustrated as separate from the terminal 116 in FIG. 1, it should be appreciated that it may be included with or integrated, in whole or in part, with the terminal 116 in other embodiments. For example, a camera input device of a smartphone may be a biometric reader 118 integrated in a mobile terminal, consistent with the description herein.

The BSPs 106*a-c* are each configured to register (or enroll), directly or indirectly, users and their biometrics to be used in interactions by the users (biometric-enabled network interactions herein), whereby each of the BSPs 106*a-c* is configured to store one or more biometric references (e.g., reference biometric templates, etc.) for a user and a biometric identifier (ID) or other identifier of the user associated with the biometric reference. Each of the BSPs 106*a-c*, then, is registered with the BIS 102, along with any merchants, or more generally, requestors, of biometric transactions (e.g., the first party 104, etc.).

Also in this example embodiment, as generally indicated above, the second party 108 may include an issuer bank configured to issue payment accounts to users (e.g., including user 112, etc.), where the payment accounts are used to fund transactions with merchants (e.g., merchant 104, etc.), for example, for the purchase of goods and/or services, etc. In that sense, the second party 108 may also be referenced as issuer 108 in this example embodiment (however, it should be appreciated that the second party is not limited to an issuer or to an issuer bank and may include other parties in other embodiments). The payment accounts issued by the second party 108 may be credit, debit, prepaid or other suitable accounts, etc. In general, the second party 108 (or issuer 108 hereinafter) is configured to receive authorization requests from a processing network (e.g., the BankNet processing network operated by Mastercard International Incorporated, etc.) (not shown), and to respond with approvals or declines as authorization replies, based on, for example, standing of the payment accounts involved in the transactions (and identified in the authorization requests), balances of the payment accounts, etc. The issuer 108 is also configured to cooperate with the processing network to clear and settle the transactions after authorization.

With continued reference to FIG. 1, in the illustrated embodiment, the system 100 also includes the mobile device 110, which is specific to the user 112 in this example. The mobile device 110 may include a smartphone, or tablet, or other communication device, etc., associated with the user 112. That said, the present disclosure is not limited to the mobile device 110. For example, in at least one other embodiment, the mobile device 110 may, more broadly, include a computing device, which may or may not be mobile with the user 112 (e.g., a desktop computer, a server, etc. versus a smartphone), whereby the user 112 may be able to manage his/her biometric profile with the BIS 102 via a website, etc.

As shown in the illustrated embodiment, the mobile device 110 includes an application 120 associated with the BIS 102 and/or the issuer 108. The application 120 may be specific and dedicated to the BIS 102 and/or the issuer 108, or may be associated with another purpose (e.g., a banking application, an identity application, a wallet application (e.g., associated with a processing network or issuer, etc.), a biometric application associated with one (or more) of the BSPs 106*a-c*, etc.), yet include an SDK or executable instruction(s) sufficient to interact with (or configure the application 120 and/or mobile device 110 to interact with) the BIS 102 and otherwise configure the mobile device 110, as described herein. Generally, the application 120 is downloaded and installed by the user 112, or otherwise present in the mobile device 110.

That said, initially in the system 100, the user 112 may enroll with one or more of the BSPs 106*a-c* through the BIS 102 to allow for biometric-enabled network interactions as described herein (e.g., as biometric enrollment, etc.). Regardless of how the user 112 enrolls (e.g., at the user's mobile device 110, at the terminal 116, otherwise, etc.), a biometric is captured for the user 112 and transmitted to the appropriate one of the BSPs 106*a-c* (with which the user 112 is enrolling), via the BIS 102. Often, part or all of the biometric data will be encrypted, prior to being transmitted and, depending on the key that is used in such encryption, may be opaque to the BIS 102. Upon receipt of the biometric data, the BIS 102 may be configured to store the biometric data in the repository 114 (e.g., as encrypted raw data, etc.) for a period of time (e.g., a duration of enrollment of the user 112, etc.), prior to forwarding the biometric data to one of the BSPs 106*a-c*, which is configured to then decrypt the biometric data, store the decrypted biometric data in memory associated therewith (e.g., as a biometric reference or reference biometric template, etc.), and assign a biometric identifier thereto.

After enrollment of the user's biometric is complete and in connection with a biometric interaction at the merchant 104 (e.g., a payment account transaction, etc.), the user 112 presents a biometric to the merchant 104 in connection with purchasing a product, service, etc. from the merchant 104. The merchant 104, and more specifically, the biometric reader 118 of the terminal 116, is configured to capture the biometric from the user 112 and submit the biometric (or form thereof) to one of the BSPs 106*a-c*, for example, the BSP 106*b*, through the BIS 102. In turn, the BSP 106*b* is configured to receive the biometric and match the biometric to a biometric reference stored in memory associated therewith, and to return the biometric ID associated with the matching biometric reference to the merchant 104, through the BIS 102. Often, the biometric data will be encrypted by the biometric reader, prior to being transmitted, and the data will be opaque to the BIS 102.

The appropriate one of the BSPs 106*a-c* to receive the biometric, for example, the BSP 106*b* in the above example, may be identified by the BIS 102 (or otherwise) based on the type of biometric captured by the biometric reader 118, based on the type of the biometric reader 118, based on the merchant 104, based on an indicator of a particular one of the BSPs 106*a-c* at the terminal 116 and/or biometric reader 118, etc. It should be appreciated that the BIS 102 and/or the BSPs 106*a-c* may also be configured to compile and store a biometric match record in memory thereof, for example, as evidence of the match and/or as details of the match (e.g., a process employed to establish the match, etc.). In particular, in the case of the BIS 102 compiling the match record, the match or record may include biometric data relating to the transaction (e.g., the biometric presented at the merchant 104, etc.), transaction details relating to the match (e.g., a transaction ID, an amount, a merchant identification, etc.), a process employed to establish the match, etc. as well as a candidate list of possible matches returned by the BSP 102 (as described more hereinafter), including one or more biometric identifiers and their respective match scores. And, in the case of the BSP 106*b* compiling the match record, the match record may include the biometric data relating to the transaction (e.g., the biometric presented at the merchant 104, etc.) and/or details of the match (e.g., a process employed to establish the match, the total list of possible identifiers and the candidate list returned to the BIS etc.), etc.

The biometric match record may be stored for a limited period of time, for example, for dispute purposes, etc. The biometric ID is then used, by the merchant 104 or the BIS 102, to determine a payment account credential (e.g., a PAN, a fPAN, a token, etc.) for the payment account associated with the biometric ID.

Once the payment account credential is obtained (be it directly (e.g., from the user 112, etc.) or via the BIS 102), it is returned, for example, by the BIS 102, to the merchant 104 (e.g., to the terminal 116 as part of an authorization packet, etc.). In response, the merchant 104 is configured to submit an authorization request for the interaction, which includes the obtained payment account credential, a transaction ID for the interaction, an amount of the interaction, a time/date of the interaction, a merchant name of the merchant 104, a MCC for the merchant 104, an acquirer ID, etc. The authorization request is submitted by the merchant 104, via a processing network, which is configured to pass the authorization request to the second party 108 (or issuer 108 of the user's account used in the transaction). The issuer 108 is configured to assess the request, and then compile an authorization reply, which includes data from the authorization request (e.g., the transaction ID, the payment account credential, etc.) and an approval (or decline) of the interaction, and transmit the authorization reply back to the merchant 104, via the processing network. The interaction is later cleared and settled, whereby the issuer 108 provides the amount of the interaction to the merchant 104, via the processing network, to fund the transaction.

That said, when the BSP 106*b*, in the example above, matches the biometric received from the terminal 116 (and/or biometric reader 118) to a biometric reference stored at the BSP 106*b*, it is possible for the BSP 106*b* to match the biometric to the wrong biometric reference, i.e., a biometric mismatch. In connection therewith, when the user 112 is associated with the payment account charged (incorrectly) for the interaction, and identifies the interaction as being incorrectly charged to his/her payment account, the user 112 submits a claim to the BIS 102 (e.g., via the mobile application 120 on the user's mobile device 110, etc.) and/or to the second party 108 (e.g., the issuer of his/her payment account, etc.), for example, to dispute the interaction and initiate a chargeback process.

Subsequently, in operation in the system 100, the BIS 102 is configured to facilitate management and resolution of such dispute by the user 112 involving the biometric-enabled network interaction (and potential disputes by other users involving biometric-enabled network interactions). In particular, in response to the user's claim, the BIS 102 is configured to receive a dispute notification for the claim involving the disputed biometric-enabled network interaction (e.g., directly or indirectly from the user 112, from the issuer 108 as part of the chargeback process, etc.). The BIS 102 is configured to retrieve the biometric match record (e.g., the biometric data, etc.) associated with the disputed interaction (e.g., from the repository 114, from the BSP 106*b*, etc.) and, depending on the resolution process, the biometric identifier and enrollment data associated therewith. The BIS 102 is configured to then request the BSP 106*b* to decrypt and return the raw biometric data from the biometric match record and, depending on the resolution process, the enrollment data. The BIS 102 is configured to then determine whether the biometric submitted in connection with the disputed interaction is representative of the user 112 (e.g., based on a comparison of the biometric data in the biometric match record to enrollment data of the user 112 retrieved, for example, from the repository 114, from the BIS 106*b*, etc.; etc.).

Upon confirmation that the biometric specific to the disputed interaction is not representative of the user 112 (e.g., the biometric data from the interaction does not match the enrollment data, etc.), the BIS 102 is configured to determine potential matches for the biometric, in isolation or in collaboration with the BSPs 106*a-c* (e.g., a candidate list of potential matches, etc.). In particular, the BIS 102 may be configured to determine other matches, for example, depending on the candidate list if it includes multiple entries, etc. Alternatively, the BIS 102 may be configured to request one or more potential matches to the biometric submitted in connection with the disputed interaction from each of the BSPs 106*a-c* (e.g., based on a comparison of the biometric to biometric references stored by the BSPs 106*a-c*, etc.). Thereafter, in this latter example, the BIS 102 is configured to receive the requested potential matches, and more particularly, biometric identifiers of the potential matches, from the BSPs 106*a-c*. In either case, in response to the potential matches, the BIS 102 is configured to identify an interacting user (e.g., the user who submitted the biometric to the merchant 104 in connection with the disputed interaction, etc.) from the list of potential matches (e.g., based on a transaction history of each of the potential matches, the context of the disputed interaction, etc.). And, when a potential match is identified as the interacting user, the BIS 102 is configured to assign or transfer the disputed interaction to the interacting user (e.g., transfer a charge associated with the disputed interaction to an account of the actual interacting user, etc.).

For instance, in one implementation of the above example, in response to the original biometric transaction at the merchant 104, in connection with initially processing the transaction, the BSP 106*b* identifies the user 112 based on the biometric provided during the transaction. However, where such match is not correct, and the user 112 did not actually initiate the transaction (e.g., where the user's payment account is charged (incorrectly) for the transaction, etc.), the user 112 identifies the transaction as being incorrectly charged to his/her payment account and submits a claim to the BIS 102 (e.g., via the mobile application 120 on the user's mobile device 110, etc.) to dispute the transaction and initiate a chargeback process. In response, the BIS 102 evaluates the biometric provided during the transaction against the reference biometric on file for the user 112 and, in this implementation, determines that the biometric specific to the disputed transaction is in fact not representative of the user 112 (e.g., the biometric from the transaction does not match the enrollment data, etc.). Thereafter, the BIS 102 determines a candidate list of potential matches for the actual biometric used in the transaction, either in isolation or in collaboration with one or more of the BSPs 106*a-c* (e.g., based on enrollment data and/or reference biometric data available to the BIS 102 and/or the BSPs 106*a-c*, etc.). Table 1 illustrates an example candidate list of users (e.g., potential matches to the biometric provided in the disputed transaction, etc.) that may be compiled by the BIS 102, and that (in this example) includes the top three biometric identifiers with the closest matches to the biometric provided in the transaction.

TABLE 1

| Candidate List | | |
|---|---|---|
| Identifier | Match Score | Name |
| ID 1 | 0.21 | User 112 |
| ID 2 | 0.21 | User 2 |
| ID 3 | 0.20 | User 3 |

First, the BIS 102 evaluates the biometric match scores or each of the users included in the candidate list (from the results in Table 1) (based on the given process, algorithm, etc. used to establish the match, etc.). In this example, the scores for the three users are substantially similar, thereby indicating that the biometrics of the users may also be similar. Next, the BIS 102 evaluates historical transaction data for each of the users. In this example, the disputed transaction occurred on a Sunday morning at the merchant 104 (from transaction data for the disputed transaction). Then, from the transaction history for each of the identified users, the BIS 102 determines that User 2 routinely purchases sandwiches from merchant 104 on Sunday mornings, while user 112 and User 3 have no transactions at merchant 104. And finally in this implementation, the BIS 102 evaluates a context of the disputed transaction. The merchant 104 at which the transaction took place is located in New York. From enrollment data for each of the users, the BIS 102 determines that user 112 and User 3 live in Missouri, while User 2 lives in New York.

From the above, the BIS 102 determines, based on the biometric match scores, that a reason, or justification, or explanation exists as to why the user 112 may have been mistaken for either User 2 or User 3 (and vice versa). The BIS 102 also determines, based on historical transaction data for the users, that User 2 is a more likely candidate for the transaction than either user 112 or User 3 because User 2 routinely purchases items from merchant 104 at a similar time to that of the disputed transaction. And, the BIS 102 further determines, based on context of the disputed transaction, that User 2 again is a more likely candidate for the transaction, because User 2 resides in the same state as the merchant 104. The BIS 102 then concludes that User 2 likely initiated the transaction and assigns or transfers the charge for the disputed interaction from the account of user 112 to the account of User 2.

It should be appreciated that in some embodiments, one or more of the BSPs 106*a-c* may not return any potential matches and/or the actual interacting user may not be one of the potential matches provided by the BSPs 106*a-c*. In these embodiments, the BIS 102 is configured to enroll the biometric submitted in connection with the disputed transaction as an anonymous user (e.g., with the BSPs 106*a-c*, etc.), whereby an interacting user may subsequently be identified as the anonymous user and so avoid a mismatch. Here, the anonymous user would have no payment credentials associated therewith, such that the anonymous user would not be able to transact based on his/her biometrics.

It should also be appreciated that while only one merchant 104 is included in FIG. 1, a different number of merchants, each associated with one of the BSPs 106*a-c*, may be included in other embodiments. Likewise, a different number of BSPs or a different number of issuers may be included in other system embodiments.

Figure 2:
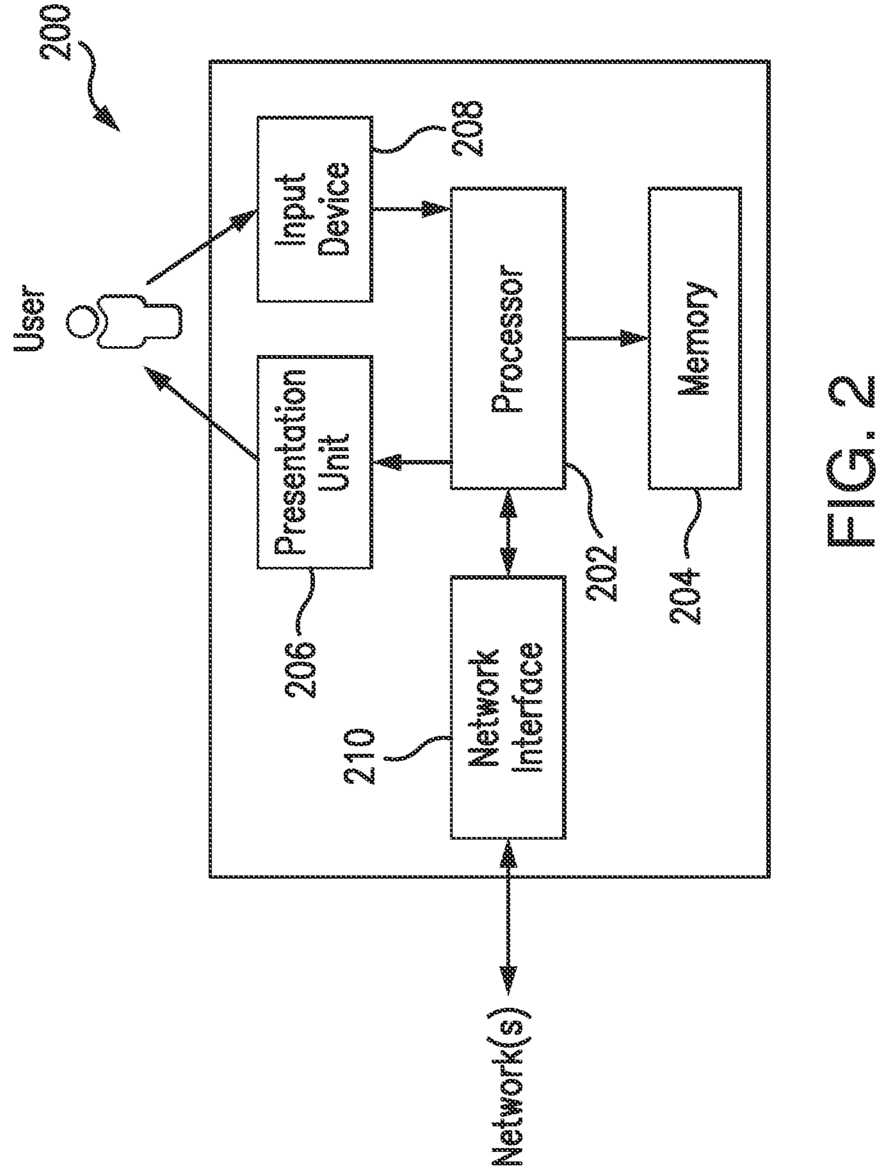
FIG. 2 is a block diagram of an example computing device that may be used in the system of FIG. 1.

FIG. 2 illustrates an example computing device 200 that may be used in the system 100 of FIG. 1. The computing device 200 may include, for example, one or more servers, workstations, personal computers, laptops, tablets, smartphones, virtual devices, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the BIS 102, the merchant 104 (e.g., the terminal 116, the biometric reader 118, etc.), the BSPs 106*a-c*, and the second party 108 (or issuer 108) may include or may be implemented in a computing device consistent with the computing device 200 (coupled to (and in communication with) the one or more networks of the system 100). What's more, the mobile device 110 may be considered a computing device consistent with the computing device 200. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, profiles, rules, biometrics, entries, policies, formatting/encryption algorithms, biometric references, identifiers, enrollment records, biometric match records, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein (e.g., one or more of the operations of method 300, etc.), such that the memory 204 is a physical, tangible, and non-transitory computer readable storage media. Such instructions often improve the efficiencies and/or performance of the processor 202 and/or other computer system components configured to perform one or more of the various operations herein, whereby upon performance of the same the computing device 200 is transformed into a special purpose computer system. It should be appreciated that the memory 204 may include a variety of different memories, each implemented in one or more of the functions or processes described herein.

In the example embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., the user 112, etc.) (e.g., notifications of biometric-enabled network interactions involving an account of the user, notifications of disputes, etc.), whereby the information may be displayed at (or otherwise emitted from) computing device 200, and in particular at presentation unit 206. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user of the computing device 200 (i.e., user inputs) such as, for example, selection, biometrics, etc., as further described herein. The input device 208 may include a single input device or multiple input devices. The input device 208 is coupled to (and is in communication with) the processor 202 and may include, for example, one or more of a keyboard, a pointing device, a mouse, a camera, a biometric reader, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC) adapter, a Bluetooth adapter, etc.), or other device capable of communicating to one or more different networks herein and/or with other devices described herein. Further, in some example embodiments, the computing device 200 may include the processor 202 and one or more network interfaces incorporated into or with the processor 202.

Figure 3:
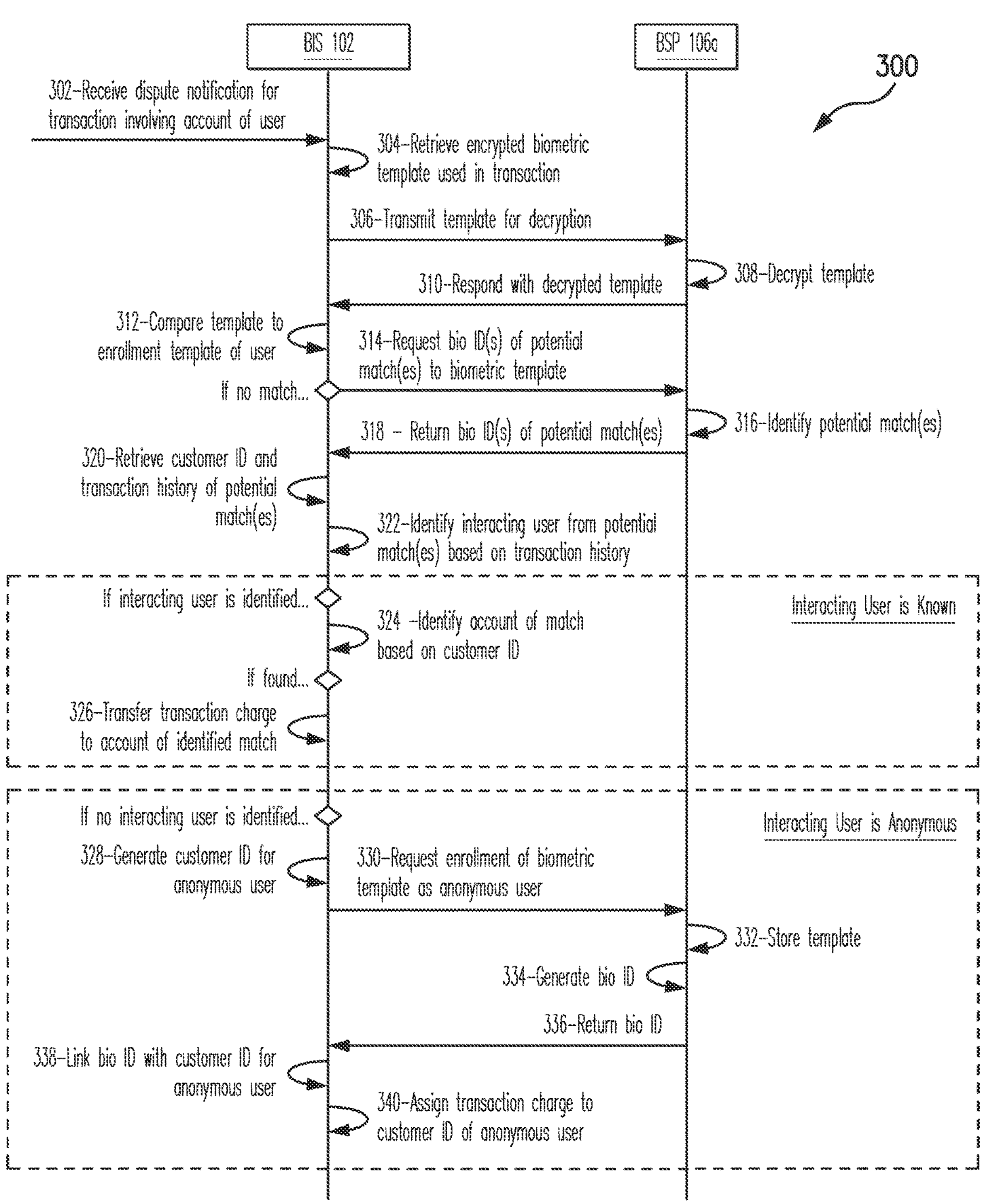
FIG. 3 is an example method, which may be implemented in connection with the system of FIG. 1, for use in managing a disputed biometric-enabled network interaction so that the biometric-enabled network interaction may be assigned to an appropriate party for resolution, etc.

FIG. 3 illustrates an example method 300 for use in managing disputes involving biometric-enabled network interactions as described herein. The example method 300 is described with reference to the BIS 102 and the other parts of the system 100, and also with reference to the computing device 200. However, the methods herein should not be understood to be limited to the system 100 or the computing device 200, as the methods may be implemented in other systems and/or computing devices. Likewise, the systems and the computing devices herein should not be understood to be limited to the example method 300.

In connection with the method 300, at the outset, the BIS 102 receives, at 302, a dispute notification for a biometric-enabled network interaction (e.g., a biometric-enabled transaction in the following example, etc.) that involves an account of the user 112 (e.g., issued by the issuer 108 (broadly, the second party 108), etc.). The biometric-enabled transaction may be disputed, for example, when it is believed that a different user performed the transaction to the account of the user 112, instead of the user 112 (e.g., as a result of a mismatched biometric, etc.). In some embodiments, the user 112 may alert the BIS 102 of the disputed transaction by transmitting the dispute notification to BIS 102 directly. In these embodiments, the user 112 has already downloaded and installed the application 120 at the mobile device 110 (e.g., as part of enrolling for biometric-enabled network interactions, etc.). Then, when the user 112 determines that the account of the user 112 has been unduly billed (e.g., as the result of an impersonation, a mismatched biometric, etc.), the user 112 accesses the application 120 in the mobile device 110 and selects an option to alert the BIS 102 of the disputed transaction. The mobile device 110, via the application 120, then transmits the dispute notification to the BIS 102. Alternatively, the user 112 may alert the BIS 102 of the disputed transaction indirectly, for example, by initiating a chargeback process for the disputed transaction through the issuer 108 (e.g., via the application 120, via directly contacting the issuer 108, etc.). Here, the issuer 108 transmits the dispute notification to the BIS 102.

In any case, the dispute notification may include an identifier for the biometric-enabled transaction and/or for the user 112, such that the BIS 102 may identify data specific to the transaction and/or the user 112 in the repository 114 (e.g., an enrollment record for the user 112, a biometric match record, the biometric template (or biometric data) associated with the transaction, etc.).

Upon receipt of the dispute notification, the BIS 102 retrieves, at 304, the biometric template (or, more generally, the biometric or biometric data) used in the disputed transaction (e.g., a biometric template specific to the transaction, etc.), for example, from the repository 114, based on an identifier included in the dispute notification. In this embodiment, the biometric template (or data) is retrieved from the repository 114 and is in encrypted form (e.g., based on an encryption format associated with the one of the BSPs 106*a-c* involved in the transaction (e.g., BSP 106*a* in the following example, etc.)). Due to the biometric template being in encrypted form, after retrieving the biometric template, in this example, the BIS 102 transmits, at 306, the template to the BSP 106*a* associated with the biometric template (e.g., based on an identifier of the BSP 106*a* linked or appended to the biometric template, etc.) for decryption. The BSP 106*a* decrypts the template, at 308, and then returns, at 310, the decrypted biometric template to the BIS 102. That said, in some examples where the biometric template used in the disputed transaction is stored at the BSP 106*a*, the BIS 102 may simply request the same from the BSP 106*a* (whereby the BSP 106*a* provides the decrypted biometric template to the BIS 102).

Thereafter, the BIS 102 determines whether the biometric template is representative of the user 112 whose account is involved in the disputed transaction. In connection therewith, the BIS 102 retrieves enrollment data of the user 112, for example, from the repository 114, from the one of the BSPs 106*a-c* with which the user 112 enrolled, etc., based on an identifier for the user 112 included in the dispute notification. Here, the retrieved enrollment data includes at least a biometric template of the user 112 generated in connection with enrollment of the user 112 (with the BIS 102, with the one of the BSPs 106*a-c*, etc.) (or an enrollment biometric template or enrollment biometric data). In some embodiments, when the enrollment biometric template is stored in the repository 114, it may be stored in encrypted format. In these embodiments, the BIS 102 may then transmit the retrieved enrollment biometric template to the BSP 106*a-c* associated therewith (e.g., BSP 106*a*, etc.) to decrypt the enrollment biometric template, and the BSP 106*a* returns the decrypted enrollment template to the BIS 102. In either case, the BIS 102 then compares, at 312, the biometric template that is specific to the disputed transaction (or transaction biometric template or transaction biometric data) to the enrollment biometric template (e.g., as retrieved from the repository 114, as received from the BSP 106*a*, etc.). When the transaction biometric template matches (or sufficiently matches based on available comparison techniques) the enrollment biometric template (e.g., the transaction biometric template is representative of the user 112, etc.), it may be concluded that the user 112 was involved in the biometric-enabled transaction, and the dispute is resolved on this basis. And, the BIS 102 notifies the user 112 (e.g., via the application 120, etc.) and/or the issuer 108 of the conclusion and may include evidence of the user's participation as part of this notification (e.g., whereby the user 112 is responsible for the transaction, etc.). In this case, the issuer 108 may then decide to charge the user 112 or not to re-imburse the user 112 if they were charged already.

However, if the transaction biometric template does not match (or does not sufficiently match) the enrollment biometric template of the user 112 (e.g., the transaction biometric template is not representative of the user 112, etc.), the BIS 102 may conclude that the user 112 was not involved in the biometric-enabled transaction. In this case, the BIS 102 seeks to identify the actual party that performed the transaction (e.g., an impostor, another user mistaken as the user 112, etc.) (broadly, interacting user) who provided the biometric sample in connection with the biometric-enabled network transaction. In some cases, the interacting user may have previously registered their biometric(s) with one or more BSPs 106*a-c*. For this purpose, the BIS 102 requests, at 314, from the BSP 106*a*, a biometric identifier associated with a biometric template (e.g., stored at the BSP 106*a*, etc.) that is a potential (or closest) match to the transaction biometric template. For example, in some embodiments, a closest match is based on a highest confidence (e.g., a highest matching percentage, etc.) between one of the biometric templates stored at the BSP 106*a* and the transaction biometric template, as determined by the BSP 106*a*. The BIS 102 may provide similar requests to the BSPs 106*b-c*.

As part of the request (at 314), the BIS 102 transmits the transaction biometric template to the BSP 106*a* (and, potentially, the other BSPs 106*b-c*). Additionally, the BIS 102 may transmit other data as part of the request, for example, a biometric identifier of the user 112 (e.g., to prevent the BSP 106*a* from returning the biometric identifier of the user 112 as the closest match, etc.). In some embodiments, the BIS 102 requests multiple biometric identifiers associated with the closest matches to the transaction biometric template (e.g., top three matches, all matches with a confidence value over a particular threshold, etc.). Additionally, in some embodiments (as indicated above), the BIS 102 requests (at 314) the biometric identifier(s) that are linked to biometric template(s) that are the closest match(es) to the transaction biometric template from each of the BSPs 106*a-c*. Doing so improves the likelihood of determining the identity of the interacting user involved in the transaction, as the interacting user may have registered biometrics with another BSP (e.g., apart from BSP 106*a*, etc.). For each of the BSPs 106*a-c*, the BIS 102 encrypts the transaction biometric template with a key specific to the particular one of the BSPs 106*a-c* and then transmits the specifically-encrypted template to each of the BSPs 106*a-c* as part of the request for the potential match(es).

For instance, upon receiving the request, the BSP 106*a* identifies, at 316, potential matches to the transaction biometric template, for example, based on a comparison of the transaction biometric template to the biometric templates stored by the BSP 106*a*. In identifying the potential matches, for example, the BSP 106*a* may identify a closest match other than the user 112 (e.g., based exclusion of biometric template(s) associated with the biometric identifier of the user 112, etc.), a number of closest matches with a highest confidence and/or matches with a confidence over a predetermined threshold, etc. Next, the BSP 106*a* returns, at 318, the biometric identifier(s) linked to the biometric template(s) of the potential match(es) to the BIS 102. In embodiments where the BIS 102 submits a request to each of the BSPs 106*a-c*, each of the BSPs 106*a-c* returns (at 318) the biometric identifier(s) linked to the biometric template(s) of the potential match(es) to the BIS 102.

When at least one of the BSPs 106*a-c* returns a match (e.g., a potential interacting user is identified by one or more of the BSPs 106*a-c*, etc.) (at 318), in order to determine whether any of the potential matches are the actual interacting user involved in the biometric-enabled network transaction, the BIS 102 retrieves, at 320, a customer identifier and an interaction history (e.g., a transaction history, etc.) for each of the potential matches, based on the biometric identifier for the potential match. In particular, the BIS 102 may retrieve the customer identifier for the potential match from the repository 114 based on a link between the biometric identifier and the customer identifier (e.g., in a profile for the potential match, etc.). Or, the BIS 102 may retrieve the customer identifier for the potential match from the one of the BSPs 106*a-c* that provided the potential match. And, the BIS 102 may retrieve the transaction history from the repository 114 (e.g., as included in the profile, etc.), from a commerce service associated with the BIS 102, from a processing network involved in processing transactions including the disputed transaction, and/or from the issuer 108, based on, for example, an account number of the potential match (e.g., a tokenized account number, a tokenized primary account number (PAN), etc.).

Next, the BIS 102 identifies, at 322, for each of the returned matches, whether the potential match is the interacting user, based on an analysis of the transaction history of the potential match. In particular, to determine whether the potential match is the interacting user, the BIS 102 determines whether there is a correlation between the transaction history of the potential match and the context of the disputed biometric-enabled network interaction (e.g., whether the transaction history for the potentially match includes a prior interaction involving the same entity, includes a pattern of similar interactions (e.g., similar times, locations, types of products, and/or entities, etc.), etc.). For instance, in the current example the disputed biometric-enabled network interaction is a transaction at the merchant 104. As such, a potential match may be identified as the interacting user when the transaction history of the potential match indicates that the potential match has previously transacted with the merchant 104. In some embodiments, in addition to transaction history (or as an alternative thereto) (at step 322), the BIS 102 may also retrieve contextual localization data from the time of the transaction to determine if the potential match is an interacting user. For example, the BIS 102 may determine, for each of the returned matches, if other (card present) transactions were performed by the potential match around the same time in the vicinity of the disputed transaction, or if the potential match was in the vicinity of the disputed transaction around the same the disputed transaction took place (e.g., based on mobile location data, etc.), etc.

When a potential match is identified as the interacting user (e.g., the interacting user is known, etc.), the BIS 102 identifies, at 324, an account (e.g., a payment account, etc.) of the interacting user, for example, based on the customer identifier of the interacting user (e.g., in the repository 114 in a profile of the interacting user, using a commerce service, etc.). If an account is found for the interacting user, the BIS 102 transfers, at 326, the biometric-enabled network interaction to the account of the interacting user. In particular, in embodiments involving payment transactions, the amount of the transaction is charged to the payment account of the interacting user. For example, the original payment transaction may be reversed as to the account of the user 112, and the transaction may then be posted to the account of the interacting user.

However, in some embodiments, the interacting user has not previously registered a payment account or payment card with the BIS 102. In these embodiments, the BIS 102 is unable to assign the transaction charge to an account of the identified interacting user, but may nonetheless assign the disputed transaction to the identified interacting user (e.g., to the biometric identifier and/or customer identifier of the interaction user, etc.). In such instances (involving unresolved interactions, etc.), the original payment transaction may still be reversed as to the account of the user 112. But, as no account is available for the interacting user (to post the transaction), the amount (or cost) of the transaction may be spread across (or allocated to) one or more of the parties involved in the original transaction, for example, the merchant 104, the issuer 108, the BIS 102, the BSP 106*a*, a payment processing network involved in processing the transaction, etc. based on one or more rules, agreements, etc.

Alternatively in the method 300, if none of the BSPs 106 returns potential matches to the BIS 102 (e.g., no matches have a confidence over the predetermined threshold, etc.) (at 318), or if the BIS 102 is unable to identify a potential match as the interacting user (at 322), the interacting user involved in the disputed interaction is considered anonymous. When the interacting user is deemed anonymous, the BIS 102 generates, at 328, a customer identifier for the anonymous user and stores the customer identifier for the anonymous user in the repository 114 (e.g., as part of a profile for the anonymous user, etc.). Then, the BIS 102 requests, at 330, that the BSP 106*a* (and optionally, BSPs 106*b-c*, etc.) enroll the transaction biometric template as a biometric template of the anonymous user. And, the BSP 106*a* stores, at 332, the transaction biometric template in a database associated with the BSP 106*a* (e.g., in memory 204, etc.). In some embodiments, the customer identifier of the anonymous user is transmitted to the BSP 106*a* as part of the request and the BSP 106*a* stores the customer identifier along with the transaction biometric template.

Next, the BSP 106*a* generates, at 334, a biometric identifier for the anonymous user and returns, at 336, the generated biometric identifier to the BIS 102. The BIS 102 stores or links, at 338 the biometric identifier with the customer identifier for the anonymous user in the repository 114 (e.g., in the profile for the anonymous user, etc.). To account for the disputed transaction, the BIS 102 assigns, at 340, the interaction (e.g., the transaction charge, etc.) to the customer identifier of the anonymous user. In this way, by enrolling the biometric of the anonymous user with the BIS 102 and assigning the disputed interaction to the anonymous user, a customer identifier is created for the anonymous user that has no privileges (e.g., no access to services of the BIS 102, etc.), but includes an outstanding bill for the biometric-enabled network transaction (and others) that has/have been conducted by the anonymous user. Thus, if the anonymous user seeks to enroll with the BIS 102 in the future, a record exists of the transactions/interactions involving that user (e.g., such that the transactions can be charged to the user, to prevent the anonymous user from enrolling in services of the BIS 102, etc.). What's more, for any subsequent transactions involving a biometric of the anonymous user, the anonymous user will be identified through such enrollment instead of a mismatch with another enrolled user thereby beneficially inhibiting, stopping, preventing, etc. further instances of such potential fraud, error, etc.

Subsequently, after an interacting user in a disputed biometric-enabled network interaction is identified as either known or anonymous, biometric identification algorithms of the BSPs 106*a-c* may be updated and/or refined (e.g., based on the biometric template of the interacting user, etc.), such that the biometric sample of the user 112 no longer collides with the biometric sample of the anonymous interacting user. In this way, the identity of the user 112 may be separated from the identity of the anonymous interacting user to prevent a false match in future biometric-enabled network interactions. For example, upon determining either a known or anonymous impostor, the BIS 102 may notify or instruct the BSPs 106*a-c* to update the biometric identification algorithms and, as part of the notification, provide the enrollment data of the user 112 and/or the biometric data associated with the disputed interaction (e.g., the transaction biometric template, etc.) to the BSPs 106*a-c*. Additionally, in some embodiments, the BIS 102 and/or the BSPs 106*a-c* may perform geographic and/or context fencing around the identity of the user 112. For example, the BIS 102 may retrieve an interaction/transaction history of the user 112 (e.g., from the repository 114, etc.) and compare the interaction/transaction history of the user 112 to the context of the underlying disputed interaction (e.g., based on the location of the interactions/transactions, the type of merchant (e.g., based on MCC, etc.), etc.). Based on this analysis, the BIS 102 and/or the BSPs 106*a-c* may prevent interactions/transactions that do not match a pattern of the user 112 from being assigned to the user 112 in the future.

In view of the above, the systems and methods herein provide for a unique combination of technical features that enables biometric interactions that are improperly assigned, based on errant biometric matching by biometric service providers (BSPs), to be re-allocated to the appropriate user, by assigning those interactions to the user who submitted their biometric in connection with the underlying interaction. The systems and method herein thus provide an efficient solution for a technical problem of disputed biometric-enabled interactions, to identify the proper user responsible for the biometric interaction, whereby the interaction is assigned to the account of the identified user. The technical problem resides, at least in part, in the single reference biometric being the basis for the transaction, while limiting the BSPs storage of personal identifying data (e.g., biometric templates, etc.) yet still providing a basis to protect the data (e.g., encryption, etc.) and adjudge the interaction as based on errant biometric matching.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following recited steps and/or operations: (a) receiving a dispute notification for a biometric-enabled network interaction involving an account of a user; (b) retrieving biometric data specific to the biometric-enabled network interaction; (c) determining whether the biometric data is representative of the user; (d) in response to the biometric data not being representative of the user, requesting, from a biometric service provider, a biometric identifier for an additional user, based on the biometric data; (e) receiving the biometric identifier from the biometric service provider; (f) identifying an interaction history of the additional user, based on the biometric identifier; (g) determining whether to assign the biometric-enabled network interaction to the additional user, based on the interaction history of the additional user; (h) determining to assign the biometric-enabled network interaction to the additional user; (i) identifying an account of the additional user based on the biometric identifier; (j) assigning the biometric-enabled network interaction to the account of the additional user; and/or (k) determining not to assign the biometric-enabled network interaction to the additional user, and (i) generating a biometric identifier for an anonymous user, (ii) enrolling the biometric data to the anonymous user, and (iii) assigning the biometric-enabled network interaction to the anonymous user.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for managing disputes in biometric-enabled network interactions, the method comprising:

- receiving, at a biometric identity switch (BIS) computing device, encrypted biometric data specific to a biometric-enabled network interaction, from a merchant, wherein the BIS computing device is part of a payment processing network processing the biometric-enabled network interaction;
- storing the encrypted biometric data in a repository for a predefined interval;
- receiving, by the BIS computing device, a dispute notification for the biometric-enabled network interaction involving an account of a user;
- retrieving, by the BIS computing device, based on a first identifier included in the dispute notification, from the repository, the encrypted biometric data specific to the biometric-enabled network interaction;
- retrieving, by the BIS computing device, enrollment data of the user, wherein the enrollment data includes enrolled biometric data of the user;
- identifying, by the BIS computing device, one of multiple biometric service providers based on a type of a biometric reader used to encrypt the encrypted biometric data;
- requesting, by the BIS computing device from the one of multiple biometric service providers, decryption of the encrypted biometric data specific to the biometric-enabled network interaction;
- in response to receiving decrypted biometric data from the one of the multiple biometric service providers, comparing, by the BIS computing device, the enrolled biometric data to the decrypted biometric data from the biometric service provider;
- in response to the enrolled biometric data not being a match for the decrypted biometric data:
  - reversing the biometric-enabled network interaction as to the account of the user; and
  - requesting, by the BIS computing device, from the one of the multiple biometric service providers, at least one biometric identifier for at least one additional user, based on the decrypted biometric data; and
- receiving, by the BIS computing device, from the one of the multiple biometric service providers, the biometric identifier and a match score for each of the at least one additional user, based on a biometric comparison of the decrypted biometric data specific to the biometric-enabled network interaction and enrolled biometric data of the at last one additional user;
- identifying, by the BIS computing device, an interaction history of the at least one additional user, based on the biometric identifier; and
- assigning, by the BIS computing device, the biometric-enabled network interaction to an account of one of the at least one additional user, based on the match score for the one of the at least one additional user and a comparison of a location of the biometric-enabled network interaction relative to a location of at least one different network interaction included in the interaction history of the one of the at least one additional user.

2. The computer-implemented method of claim 1, further comprising: identifying, by the BIS computing device, the account of the additional user based on the biometric identifier.

3. The computer-implemented method of claim 1, wherein the at least one additional user includes multiple additional users.

4. The computer-implemented method of claim 1, wherein the biometric-enabled network interaction is a payment account transaction.

5. The computer-implemented method of claim 1, wherein the biometric data is based on a fingerprint or a facial image.

6. A non-transitory computer-readable storage medium comprising executable instructions, which when executed by at least one processor of a biometric identity switch (BIS) computing device in connection with a dispute involving a biometric-enabled network interaction, cause the at least one processor to:

receive encrypted biometric data specific to a biometric-enabled network interaction, from a merchant;

store the encrypted biometric data in a repository for a predefined interval; receive a dispute notification for the biometric-enabled network interaction, wherein the biometric-enabled network interaction involves an account of a user;

retrieve, based on a first identifier included in the dispute notification, from the repository, the encrypted biometric data specific to the biometric-enabled network interaction;

retrieve enrollment data of the user, wherein the enrollment data includes enrolled biometric data of the user;

identify one of multiple biometric service providers based on a type of a biometric reader used to encrypt the encrypted biometric data request, from the one of multiple biometric service providers, decryption of the encrypted biometric data specific to the biometric-enabled network interaction;

in response to receiving decrypted biometric data from the one of the multiple biometric service providers, compare the enrolled biometric data to the decrypted biometric data from the biometric service provider;

determine that the decrypted biometric data from the one of the multiple biometric service providers is not a match for the enrolled biometric data of the user;

based on the determination:

reverse the biometric-enabled network interaction as to the account of the user; and request, from the biometric service provider, at least one biometric identifier for at least one additional user, based on the decrypted biometric data;

receive, from the one of the multiple biometric service providers, the biometric identifier and a match score for each of the at least one additional user, based on a biometric comparison of the decrypted biometric data from the biometric service provider and enrolled biometric data of the at least one additional user;

identify an interaction history of the at least one additional user, based on the at least one biometric identifier;

compare a location of the biometric-enabled network interaction to a location of at least one different network interaction in the interaction history of the at least one additional user; and in response to the match score for one of the at least one additional user and a match between the location of the at least one different network interaction in the interaction history of the one of the at least one additional user and the location of the biometric-enabled network interaction, assign the biometric-enabled network interaction to an account of the one of the at least one additional user.

7. The non-transitory computer-readable storage medium of claim 6, wherein the executable instructions, when executed by the at least one processor of the BIS computing device, further cause the at least one processor to, in response to the interaction history of the one of the at least one additional user not matching the location of the biometric-enabled network interaction:

generate a biometric identifier for an anonymous user; and enroll the biometric data to the anonymous user, prior to assigning the biometric-enabled network interaction to the anonymous user.

8. The non-transitory computer-readable storage medium of claim 7, wherein the biometric-enabled network interaction is a payment account transaction; and wherein the biometric data is based on a fingerprint or a facial image.

* * * * *